(12) United States Patent
Koziol

(10) Patent No.: US 11,853,634 B2
(45) Date of Patent: Dec. 26, 2023

(54) DETACHABLE DISPLAY SYSTEM

(71) Applicant: Jeffrey E. Koziol, Arlington Heights, IL (US)

(72) Inventor: Jeffrey E. Koziol, Arlington Heights, IL (US)

(*) Notice: Subject to any disclaimer, the term of this patent is extended or adjusted under 35 U.S.C. 154(b) by 291 days.

(21) Appl. No.: 15/900,020

(22) Filed: Feb. 20, 2018

(65) Prior Publication Data
US 2018/0239574 A1 Aug. 23, 2018

Related U.S. Application Data

(60) Provisional application No. 62/461,779, filed on Feb. 21, 2017.

(51) Int. Cl.
| | |
|---|---|
| *G06F 3/14* | (2006.01) |
| *G06F 1/16* | (2006.01) |
| *H04M 1/72409* | (2021.01) |
| *H04B 5/00* | (2006.01) |
| *H04M 1/02* | (2006.01) |

(52) U.S. Cl.
CPC ............ *G06F 3/1423* (2013.01); *G06F 1/165* (2013.01); *G06F 1/1654* (2013.01); *H04M 1/72409* (2021.01); *G06F 1/1632* (2013.01); *G06F 3/1446* (2013.01); *G09G 2300/026* (2013.01); *G09G 2354/00* (2013.01); *H04B 5/0037* (2013.01); *H04M 1/0274* (2013.01); *H04M 2250/16* (2013.01)

(58) Field of Classification Search
CPC ....... G06F 1/1632; G06F 1/165; G06F 3/1423
See application file for complete search history.

(56) References Cited

U.S. PATENT DOCUMENTS

| | | | |
|---|---|---|---|
| 7,481,360 B1* | 1/2009 | Ramachandran | .... G06Q 20/223 235/379 |
| 8,578,192 B2* | 11/2013 | Vasquez | ................... G09G 3/36 345/212 |
| 9,235,373 B2* | 1/2016 | Toren | ..................... G06F 3/1423 |
| 2004/0070553 A1* | 4/2004 | Youden | ................. G06F 3/1423 345/13 |
| 2004/0239677 A1* | 12/2004 | Mutanen | ................... G06F 3/14 345/545 |

(Continued)

*Primary Examiner* — Van N Chow
(74) *Attorney, Agent, or Firm* — Dickinson Wright PLLC

(57) ABSTRACT

Systems and methods including detachable passive or interactive display that interface with fixed size portable communication or display device providing variable size display capability. Detachable display can comprise compartment for seamlessly accommodating portable communication or display device. Interface between the portable device and the detachable display can be implemented by wired or wireless communication. Detachable display can include weatherproof body, and compartment accommodating portable device can include weatherproof seal protecting the portable device. Detachable display device can include an additional user interface providing functionality of any complexity, from basic on/off and volume control switches to complex interactive menu navigation tools and other controls such as touch pads and biometric sensors. Detachable display device can include data input and output capabilities, such as text, audio and video, to other external devices.

14 Claims, 12 Drawing Sheets

(56) References Cited

U.S. PATENT DOCUMENTS

| | | | |
|---|---|---|---|
| 2005/0015731 A1* | 1/2005 | Mak | G06F 3/0481 |
| | | | 715/779 |
| 2006/0077152 A1* | 4/2006 | Chui | G02B 26/001 |
| | | | 345/85 |
| 2006/0101293 A1* | 5/2006 | Chandley | G06F 1/3203 |
| | | | 713/300 |
| 2006/0209218 A1* | 9/2006 | Lee | G04G 17/08 |
| | | | 349/1 |
| 2008/0225033 A1* | 9/2008 | Hector | G09G 3/3666 |
| | | | 345/87 |
| 2012/0060089 A1* | 3/2012 | Heo | G06F 1/1647 |
| | | | 715/702 |
| 2012/0081317 A1* | 4/2012 | Sirpal | G06F 1/1616 |
| | | | 345/173 |
| 2015/0009336 A1* | 1/2015 | Wang | H04N 5/232945 |
| | | | 348/165 |
| 2015/0133193 A1* | 5/2015 | Stotler | G06F 1/163 |
| | | | 455/557 |
| 2015/0287202 A1* | 10/2015 | Wang | H04N 5/33 |
| | | | 382/128 |
| 2019/0057647 A1* | 2/2019 | Hack | G09G 3/3225 |
| 2020/0249726 A1* | 8/2020 | Brocklesby | H02G 11/003 |

* cited by examiner

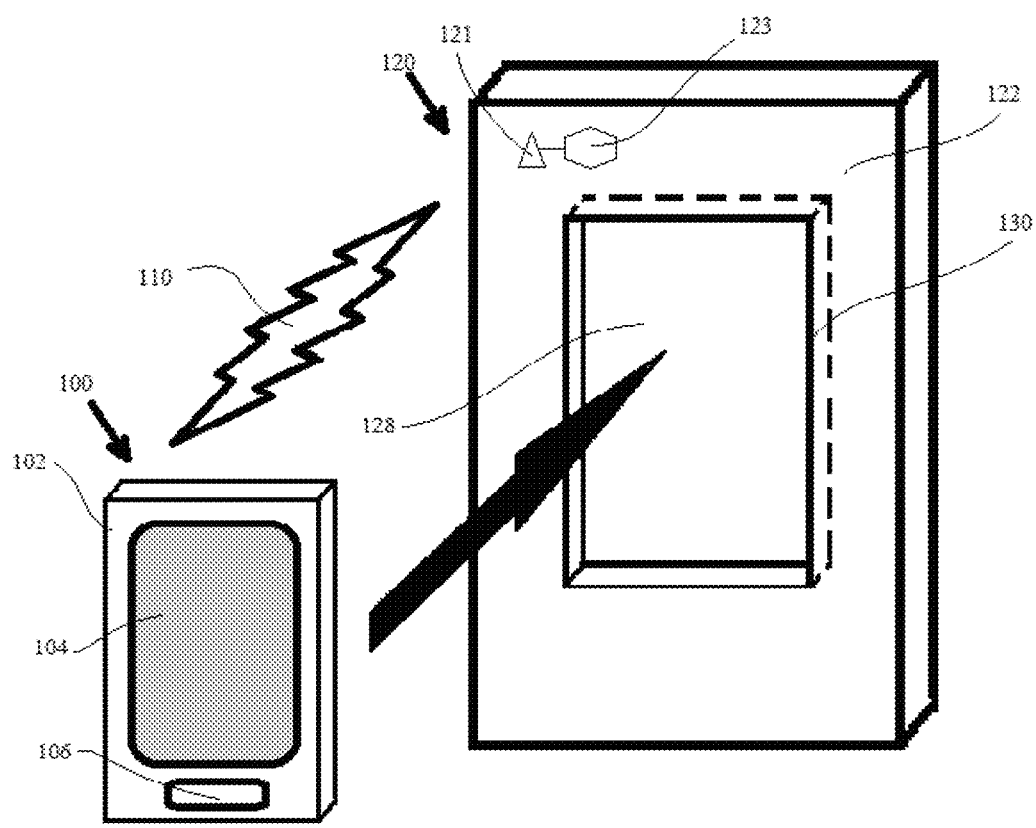
Figure 1A
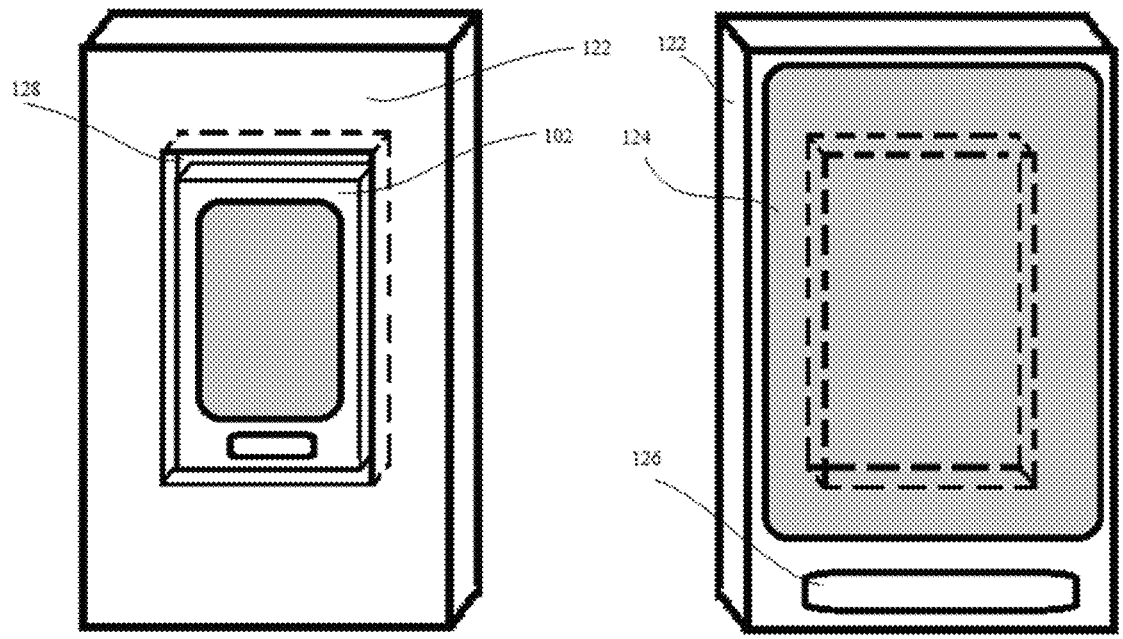
Figure 1B
Figure 1C

BACK

FRONT

DETACHABLE DISPLAY SYSTEM

This application claims priority to prior U.S. Provisional Patent Application No. 62/461,779, filed Feb. 21, 2017, the entire content of which is incorporated herein by reference.

BACKGROUND OF THE INVENTION

1. Field of the Invention

Generally, exemplary embodiments of the present invention relate to the field of devices using interactive and passive display. Exemplary implementations of certain embodiments of the present invention provide systems and methods for improving user interface and display capabilities of portable communication or display devices, such as portable digital video or image display devices, smart phones, or personal digital assistants (PDAs).

2. Discussion of the Background of the Invention

Presently, portable communication or display devices have either passive or interactive display screens. Passive display screens, such as a television and/or video monitor, simply outputs images or video, while interactive display screens, such as touch screens, also provide interactive input capability for the device user and serve as a user interface or the portable communication or display device.

However, the display screens of convention portable communication or display devices are fixed size. Thus, while a consumer can choose from a verity of smartphones or PDAs of varying sizes, once the choice is made the consumer is essentially stuck with the screen size of the purchased devices. The consumers' choice of screen size is driven primarily by the intended use of the smart phone. For example, a small screen size is more appropriate when portability is a factor, while a large screen size may be more optimal for viewing videos or images, as well as ease of touch screen operations. Since, a consumer may wish to use a smart phone as a portable communication device, as well as a video or image display device, there is a need for a consumer to have optional screen sizes capability without having to invest in multiple communication devices whose only difference is the screen size.

SUMMARY OF THE INVENTION

Exemplary embodiments of the present invention address at least such need by providing systems and methods including a detachable passive or interactive display that interface with a fixed size portable communication or display device providing variable size display capability.

In an exemplary implementation of the present invention, a detachable display comprises a compartment for seamlessly accommodating a portable communication or display device. Interface between the portable device and the detachable display can be implemented by wired or wireless communication.

According to exemplary embodiments of the present invention, detachable display includes a weatherproof body, and compartment accommodating a portable device includes a weatherproof seal protecting the portable device.

According to another exemplary embodiment of the present invention, a detachable display device can include an additional user interface providing functionality of any complexity, from basic on/off and volume control switches to complex interactive menu navigation tools and other controls such as touch pads and biometric sensors.

According to yet another exemplary embodiment of the present invention, a detachable display device can include data input and output capabilities, such as text, audio and video, to other external devices.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein FIGS. 1A, 1B, and 1C provide illustrative examples of exemplary configurations of display systems and devices, and various components thereof, according to exemplary embodiments of the present invention.

DETAILED DESCRIPTION OF EXEMPLARY EMBODIMENTS

Figure 2A:
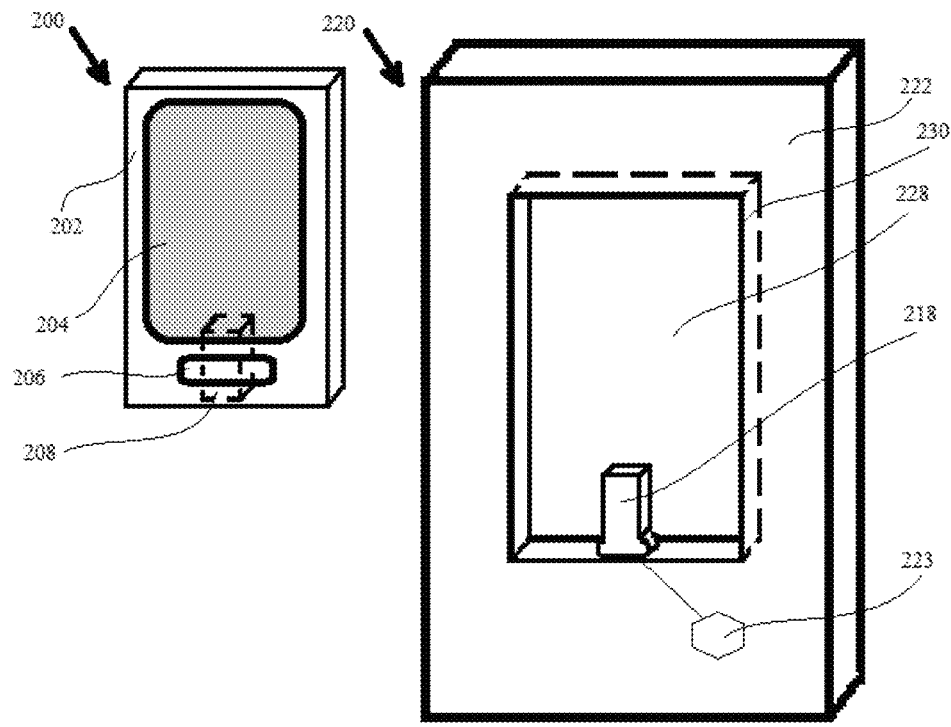
FIGS. 2A, 2B, 2C and 2D provide illustrative examples of further exemplary configurations of display systems and devices, and various components thereof, according to exemplary embodiments of the present invention.

The matters exemplified in this description are provided to assist in a comprehensive understanding of exemplary embodiments of the invention. Accordingly, those of ordinary skill in the art will recognize that various changes and modifications of the embodiments described herein can be made without departing from the scope and spirit of the described invention. Also, descriptions of well-known functions and constructions are omitted for clarity and conciseness.

Referring to an example of FIGS. 1A, 1B and 1C, a system according to an exemplary embodiment of the present invention includes a detachable display 120 comprising display body 122 and a portable communication or display device 100, which can be any one of a portable digital video or image display devices, smart phones, or personal digital assistants (PDAs). Display 120 includes a compartment 128 for removably accommodating device 100 such that, in an exemplary implementation, resilient edge 130 of compartment 128 is configured to cooperate with body 102 of device 100 to securely retain device 100 in compartment 128 as shown in FIG. 1B. In an exemplary implementation, edge 130 can be integrally formed with body 122 as illustrated in FIG. 1A.

FIGS. 1A, 1B and 1C show a host device, or a display 120, including a microprocessor 123 and a wireless transceiver 121, interfacing with device 100 via a wireless near field radio frequency communication 110, such as Bluetooth, according to an exemplary embodiment of the present invention. Display 120 includes a passive or interactive screen 124, which can be selectively or automatically configured to mimic the functionality of passive or interactive screen 104 of portable device 100, or provide additional functionality, when establishing communication between display 120 and device 100. Screen 124 has a larger surface display area than screen 104. In yet another exemplary implementation, display 120 can include additional user interface 126, which can be selectively or automatically configured to mimic the functionality of interface 106 of portable device 100, or provide additional functionality, when establishing communication between display 120 and device 100.

FIG. 1B illustrates en exemplary implementation of an embodiment of the present invention where portable device body 102 is placed in compartment 128 of display body 122 such that portable device screen 104 and interface 106 remain user accessible and can continue to retain all functionality whether or not some or all of the functionality is mimicked by screen 124 and/or interface 126. According to another exemplary implementation of the present invention, portable device body 102 can be selectively placed in compartment 128 such that portable device screen 104 and interface 106 are not accessible, and some or all of the functionality of screen 104 and interface 106 is mimicked by screen 124 and/or interface 126, for example automatically upon placement of device body 102 in compartment 128.

Figure 2B:
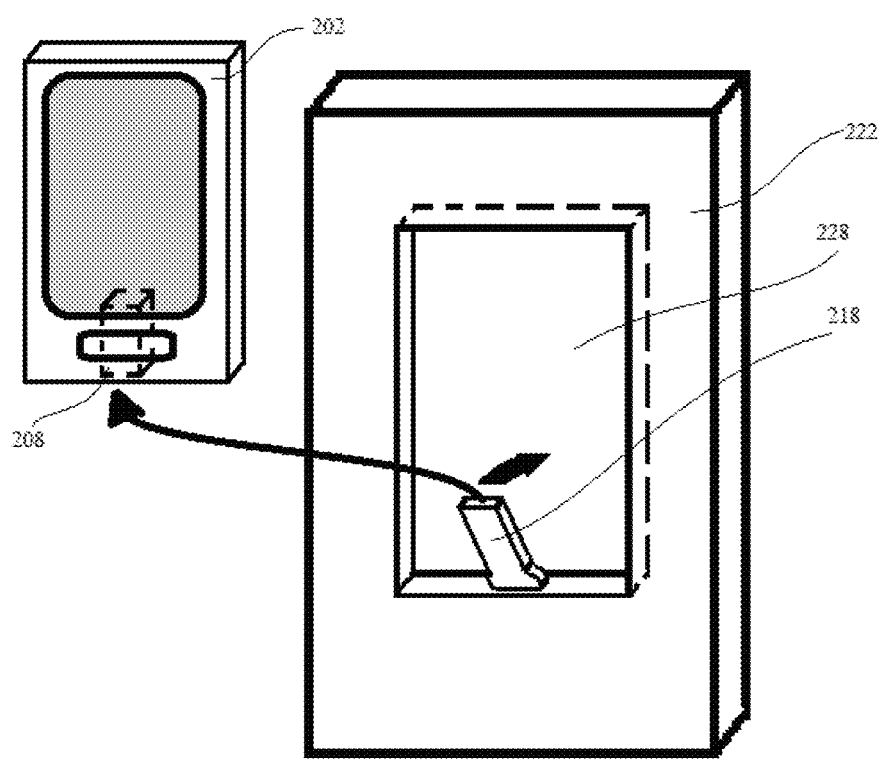
Figure 2C:
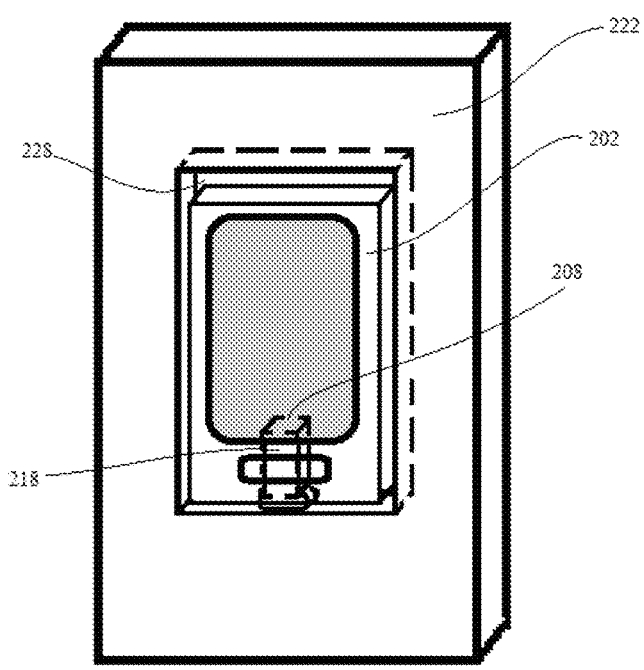
Figure 2D:
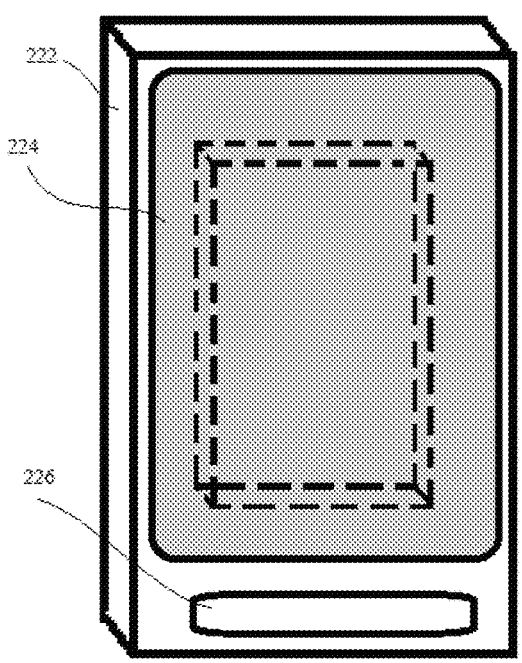

Referring to an example of FIGS. 2A, 2B, 2C and 2D, a system according to an exemplary embodiment of the present invention includes a host device, or a detachable display, 220 comprising display body 222 and a portable communication or display device 200, which can be any one of a portable digital video or image display devices, smart phones, or personal digital assistants (PDAs). Display 220 includes a compartment 228 for removably accommodating device 200 such that, in an exemplary implementation, resilient edge 230 of compartment 228 is configured to cooperate with body 202 of device 200 to securely retain device 200 in compartment 228 as shown in FIG. 2C. In an exemplary implementation, edge 230 can be integrally formed with body 222 as illustrated in FIG. 2A.

Figure 7:
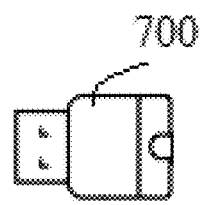
FIGS. 7, 8, and 9 graphically illustrated non-limiting examples of wired interfaces for display systems, devices and various components thereof, according to exemplary embodiments of the present invention FIGS. 10A, 10B and 10C provide illustrative example of further exemplary configurations of display systems, devices, and various components thereof, according to exemplary embodiments of the present invention.
Figure 8:
Figure 9:
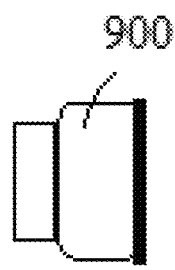

FIGS. 2A, 2B, 2C and 2D show a host device, or a display, 220 according to an exemplary embodiment of the present invention, including a microprocessor 223, interfacing with device 200 via a wired interface 218, such as for example Universal Serial Bus (USB) interface 700 illustrated in FIG. 7, USB mini interface 800 illustrated in FIG. 8, or any other multi-pin interface 900 graphically illustrated in FIG. 9.

According to an exemplary embodiment of the present invention, interface 218 can be a male interface rotationally mounted within compartment 228 such that portable device body 202 having a corresponding female interface 208 can be removably connected to display 220, as illustrated in FIG. 2B, and secured in compartment 228, as illustrated in FIG. 2C.

Similar to embodiments of FIG. 1A-1C, display 220 includes a passive or interactive screen 224, which can be selectively or automatically configured to mimic the functionality of passive or interactive screen 204 of portable device 200, or provide additional functionality, when establishing communication between display 220 and device 200. Screen 224 has a larger surface display area than screen 204. In yet another exemplary implementation, display 220 can include additional user interface 226, which can be selectively or automatically configured to mimic the functionality of interface 206 of portable device 200, or provide additional functionality, when establishing communication between display 220 and device 200.

FIG. 2C illustrates an exemplary implementation of an embodiment of the present invention where portable device body 202 is placed in compartment 228 of display body 222 such that portable device screen 204 and interface 206 remain user accessible and can continue to retain all functionality whether or not some or all of the functionality is mimicked by screen 224 and/or interface 226. According to another exemplary implementation of the present invention, interfaces 208 and 218 are such that portable device body 202 can be selectively placed in compartment 228 such that portable device screen 204 and interface 206 are not accessible, and some or all of the functionality of screen 204 and interface 206 is mimicked by screen 224 and/or interface 226, for example automatically upon placement of device body 202 in compartment 228. A non-limiting example of interfaces 208 and 218 can be provided by USB mini interface 800 graphically illustrated in FIG. 8, which allows body of device 202 to be connected to interface 218 with screen 202 facing out of compartment 228, as shown in FIGS. 2B and 2C, or vive-versa facing into compartment 228.

Figure 3:
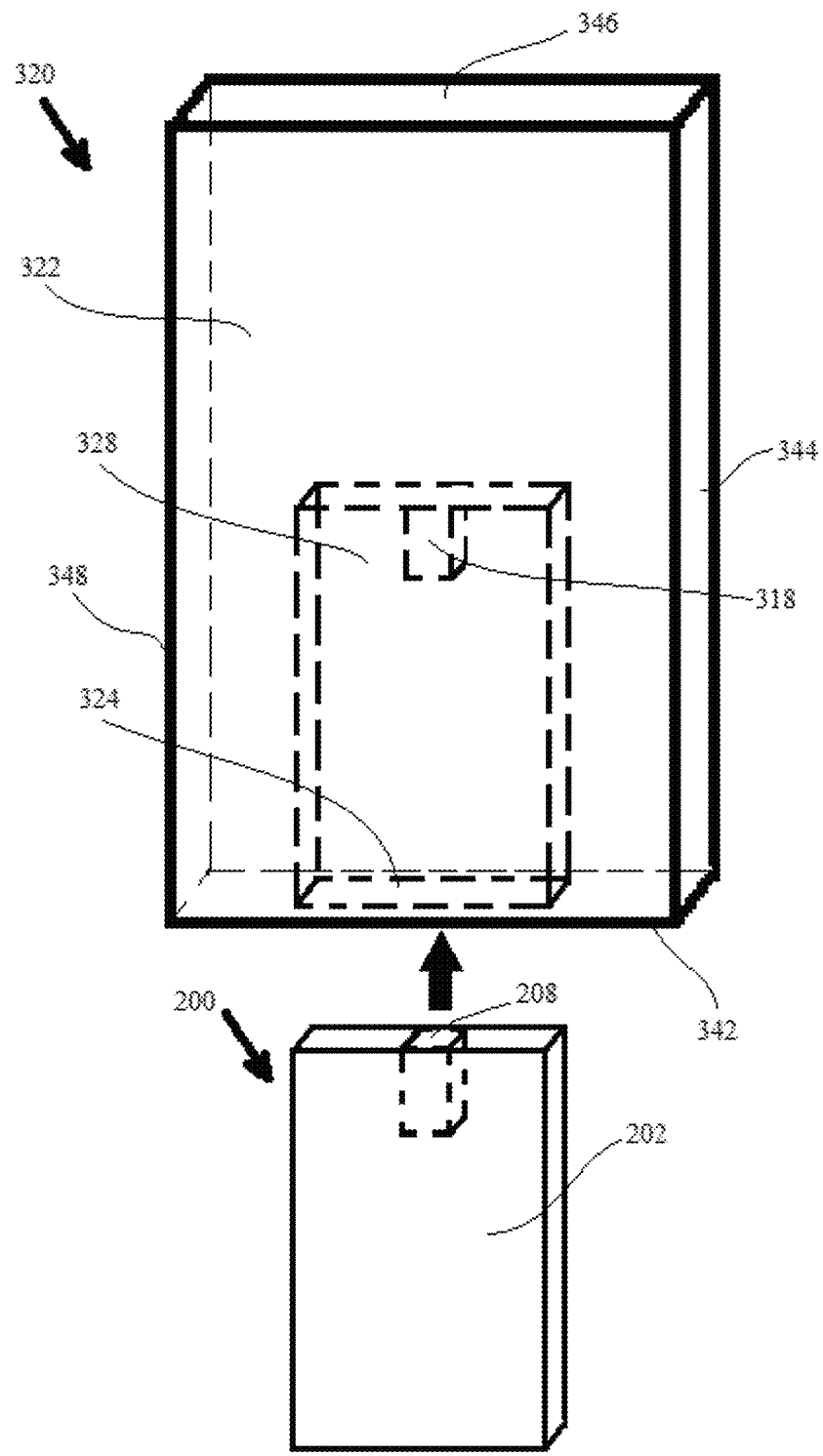
FIG. 3 provides an illustrative example of yet further exemplary configuration of display systems and devices, and various components thereof, according to exemplary embodiments of the present invention.

Referring to an example of FIG. 3, according to yet another exemplary embodiment of the present invention, a host device, or a detachable display, 320 comprising display body 322 and a compartment 328 inside the body 322 having an opening 324 on side face 342 for receiving device 200 to removably accommodate device 200 within compartment 328. In an exemplary implementation utilizing wired communication, compartment 328 includes a male interface 318 fixedly mounted within compartment 328 such that portable device body 202 having a corresponding female interface 208 can be removably connected to display 320 and secured in compartment 348. In an exemplary implementation illustrated in FIG. 3, portable device body 202 is placed in compartment 328 such that portable device screen 204 and interface 206 are not accessible, and some or all of the functionality of screen 204 and interface 206 is mimicked by screen or other interface provides by display 320 in the same manner as in the examples of display 220, for example automatically upon placement of device body 202 in compartment 328. Screen 324 has a larger surface display area than screen 204.

Non-limiting examples of interface 318 include USB interface 700, USB mini interface 800, or any other multi-pin interface 900. In other exemplary implementations of the present invention, compartment 328 can be configured within display body 322 such that opening 324 can be positioned with respect to any other side face 344, 346 and/or 348 of display body 322. In yet further exemplary implementation of embodiments of the present invention, compartment 328 can be configured to accommodate entire portable device body 202, or a portion of body 202 sufficient to securely retain body 202 in compartment 328 when device 200 is connected to display 320.

Figure 4A:
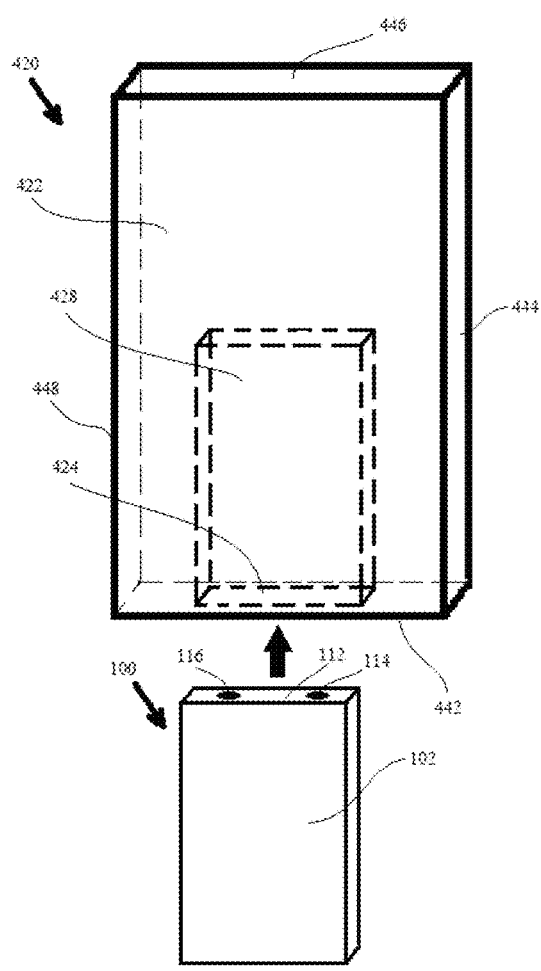
FIGS. 4A and 4B provide illustrative examples of still further exemplary configurations of display systems and devices, and various components thereof, according to exemplary embodiments of the present invention.
Figure 4B:
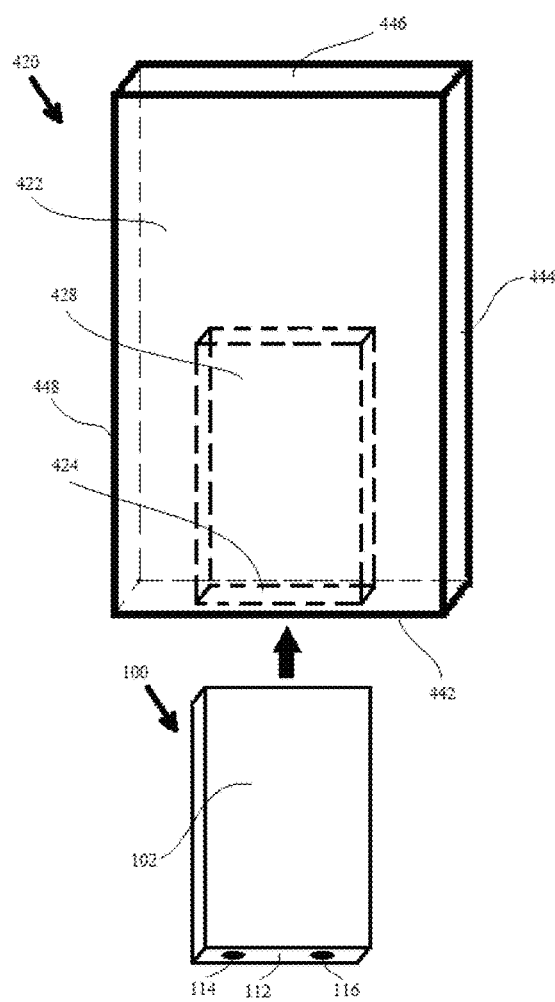

Referring to an example of FIGS. 4A and 4B, according to yet another exemplary embodiment of the present invention, a host device, or a detachable display, 420 comprising display body 422 and a compartment 428 inside the body 422 having an opening 424 on side face 442 for receiving device 100 to removably accommodate device 100 within compartment 428. In an exemplary implementation utilizing wireless communication, device body 102 can be selectively placed in compartment 428 such that side device surface 112 having device input/output ports 116, 114 is concealed in compartment 428, as shown in FIG. 4A, or exposed as shown in FIG. 4B. In an exemplary implementation illustrated in FIGS. 4A and 4B, portable device body 102 is placed in compartment 428 such that portable device screen 104 and interface 106 are not accessible, and some or all of the functionality of screen 104 and interface 106 is mimicked by screen or other interface provides by display 420 in the same manner as in the examples of display 120, for example automatically upon placement of device body 102 in compartment 428. Screen of display 420 has a larger surface display area than screen 104.

In other exemplary implementations of the present invention, compartment 428 can be configured within display body 422 such that opening 424 can be positioned with respect to any other side face 444, 446 and/or 448 of display body 422. In yet further exemplary implementation of embodiments of the present invention, compartment 428 can be configured to accommodate entire portable device body 102, or a portion of body 102 sufficient to securely retain body 102 in compartment 428.

Figure 5A:
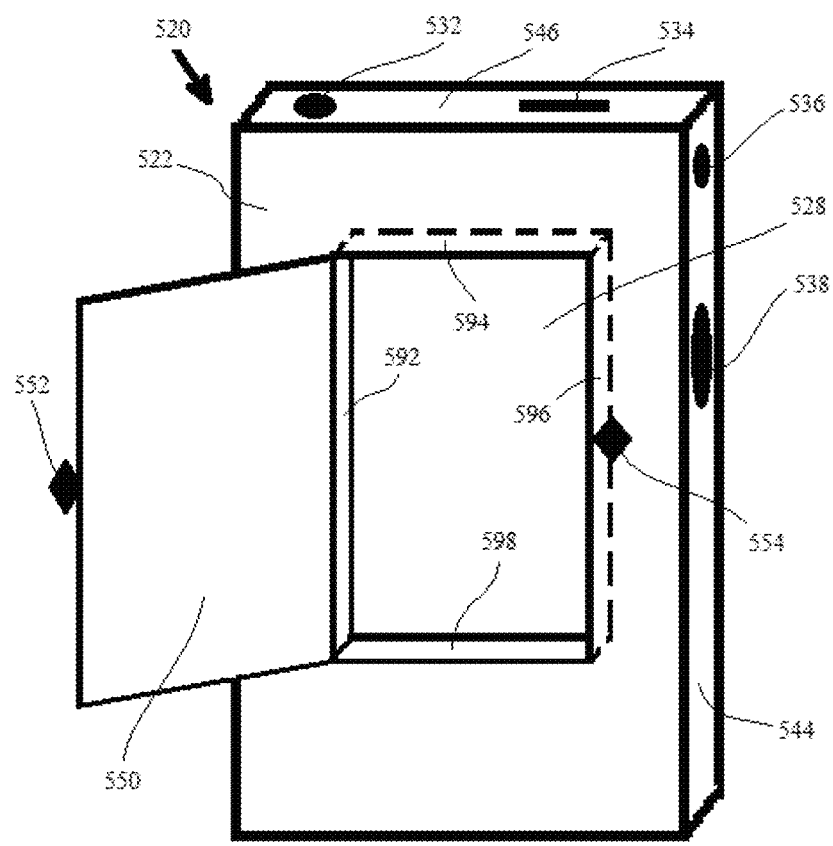
FIGS. 5A and 5B provide illustrative examples of another exemplary configurations of display system and various components thereof, according to exemplary embodiments of the present invention.
Figure 5B:
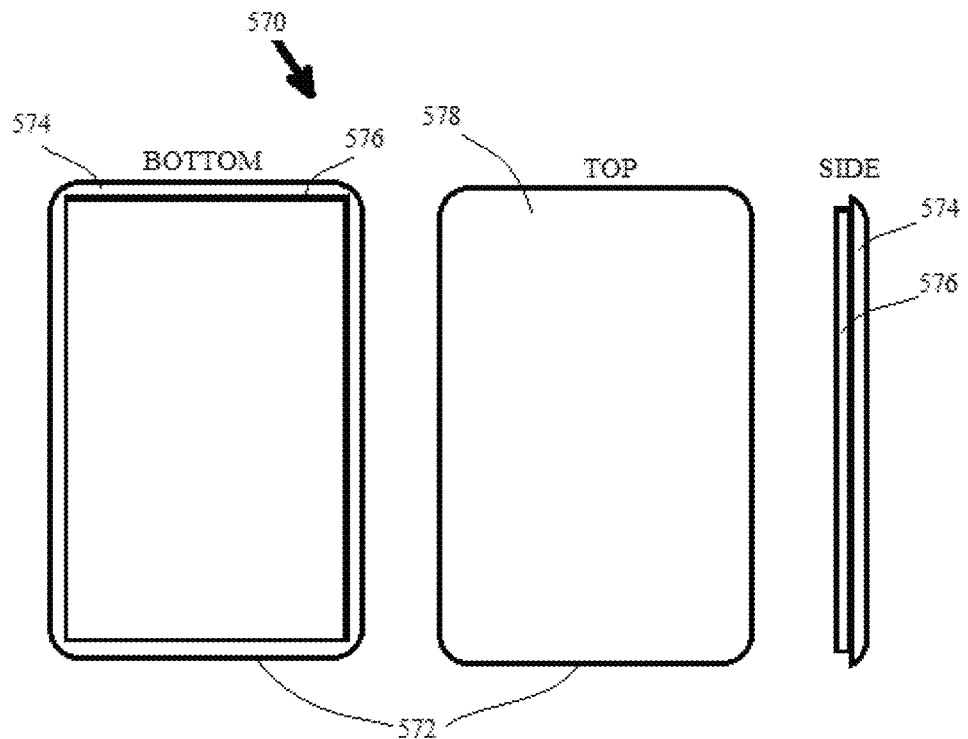

Referring to an example of FIGS. 5A and 5B, an exemplary embodiment of the present invention includes a host device, or a detachable display, 520 comprising display body 522 for removably accommodating device 100 or 200 in compartment 528, such that, in an exemplary implementation, compartment 528 includes a cover 550 and a latch mechanism 552,554 as shown in FIG. 5A, to securely retain device 100 or 200 in compartment 528. In an exemplary implementation, body 520 and cover 550 provide a weatherproof seal for device 100 or 200 place in compartment 528. In the case of device 100, wireless communication with display 520 is provided as described with reference to FIGS. 1A-1C. On the other hand, in the case of device 200, wired communication with display 520 can be established by providing a wired interface as described with reference to FIGS. 2A-2D. In yet another exemplary implementation display 520, as well as display 220, can include both wired and wireless communication capability. Screen of display 520 has a larger surface display area than screen 104 or 204.

In the example of FIG. 5A, cover 550 is attached to body 522, for example by a pivoting hinge (not shown) and secured by latch 552,554. In yet another exemplary implementation, device 520 is configure with a removable cover 570 illustrated in the example of FIG. 5B. Cover 570 includes a top surface 578, which can be a transparent surface allowing viewing and or interactive input for screen 104, 204 of device 100, 200 when placed in compartment 528 as shown in FIGS. 1B and 2C. Cover 570 also includes lip 574 tab 576 such that lip 574 extends onto body 522 and tab 576 securely fits against sidewalls 592,594,596,598 of compartment 528 when cover 570 is placed over compartment 528 to secure device 100 or 200 within compartment 528. In an exemplary implementation, body 520 and cover 570 provide a weatherproof seal for device 100 or 200 place in compartment 528.

According to yet another exemplary implementation of the present invention, display 520, as well as display 120 or 220, can include one or more input/output ports 532, 534, 536, 538 on one or more of any side faces, such as 544, 546 of display 520. These ports can include any one or more of data or power ports providing data input/output and or power for display 520 and/or device 100,200 in compartment 528.

Figure 6A:
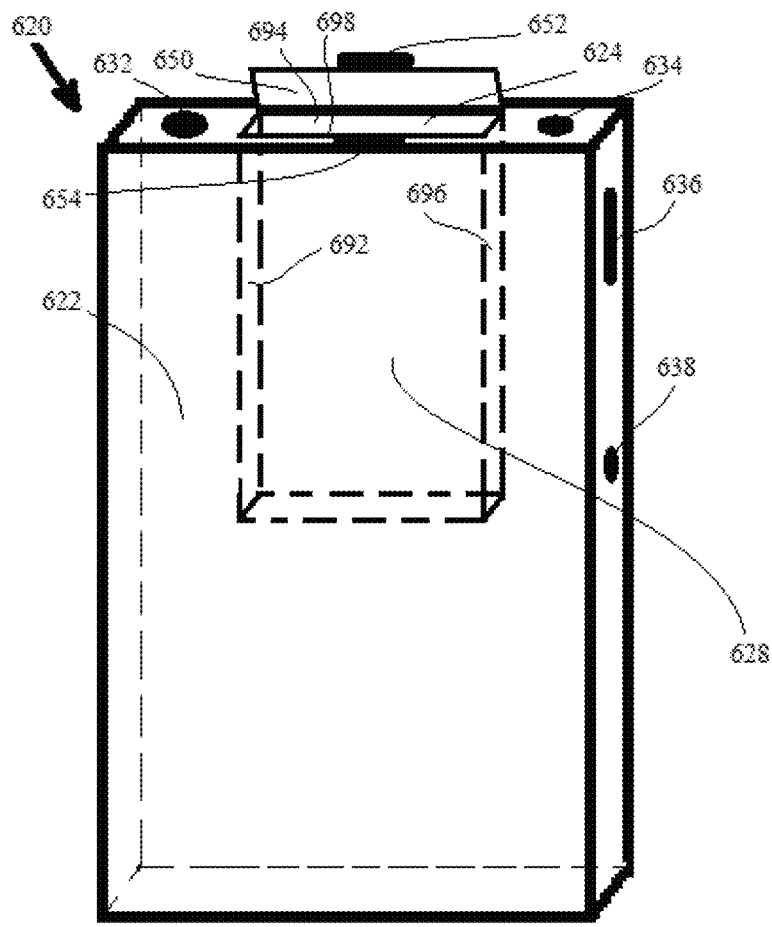
FIGS. 6A and 6B provide illustrative examples of yet another exemplary configurations of display system and various components thereof, according to exemplary embodiments of the present invention.
Figure 6B:
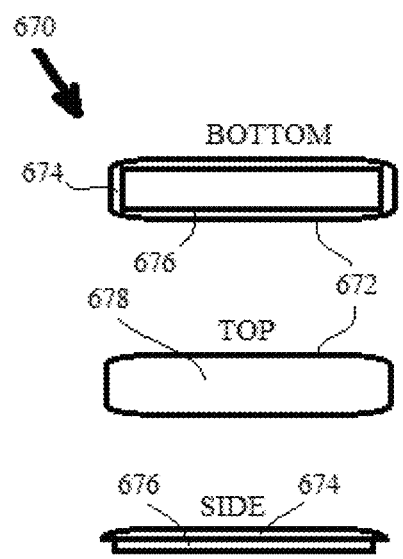

Referring to an example of FIGS. 6A and 6B, an exemplary embodiment of the present invention includes a host device, or a detachable display, 620 comprising display body 622 for removably accommodating device 100 or 200 in compartment 628, such that, in an exemplary implementation, compartment 628 includes a cover 650 and a latch mechanism 652,654 as shown in FIG. 6A, to securely retain device 100 or 200 in compartment 628. In an exemplary implementation, body 620 and cover 650 provide a weatherproof seal for device 100 or 200 place in compartment 628. In the case of device 100, wireless communication with display 620 is provided as described with reference to FIGS. 1A-1C and 4A-4B. On the other hand, in the case of device 200, wired communication with display 620 can be established by providing a wired interface as described with reference to FIG. 3. In yet another exemplary implementation display 620, as well as display 220, can also include both wired and wireless communication capability. Screen of display 620 has a larger surface display area than screen 104 or 204.

In the example of FIG. 6A, cover 650 is attached to body 622, for example by a pivoting hinge (not shown) and secured by latch 652,654. In yet another exemplary implementation, device 620 is configure with a removable cover 670 illustrated in the example of FIG. 6B. Cover 670 includes a top surface 678, lip 674, and tab 676 such that lip 674 extends onto body 622 and tab 676 securely fits against sidewalls 692,694,696,698 of compartment 628 when cover 670 is placed over compartment 628 to secure device 100 or 200 within compartment 628. In an exemplary implementation, body 620 and cover 670 provide a weatherproof seal for device 100 or 200 place in compartment 628.

According to yet another exemplary implementation of the present invention, display 620, as well as display 320 or 420, can include one or more input/output ports 632, 634, 636, 638 on one or more of any side faces, such as 644, 646 of display 620. These ports can include any one or more of data or power ports providing data input/output and or power for display 620 and/or device 100,200 in compartment 628.

Figure 10A:
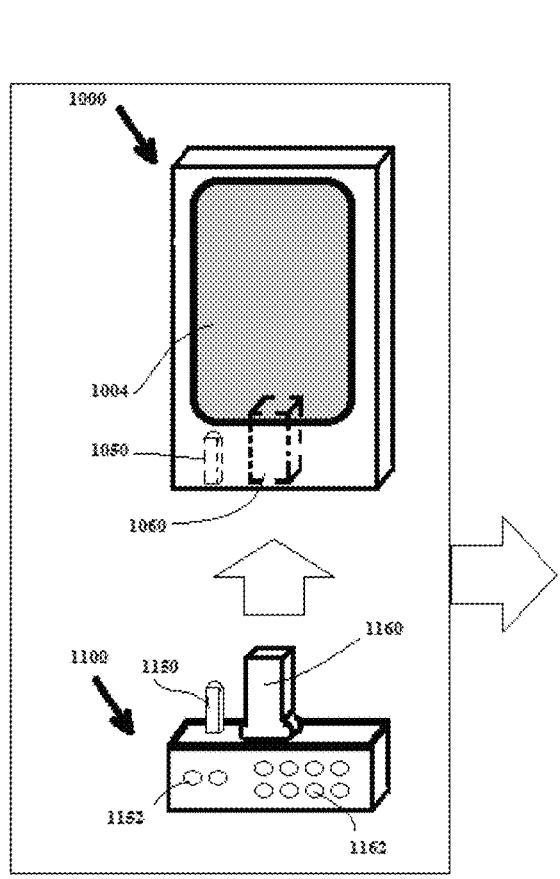
Figure 10B:
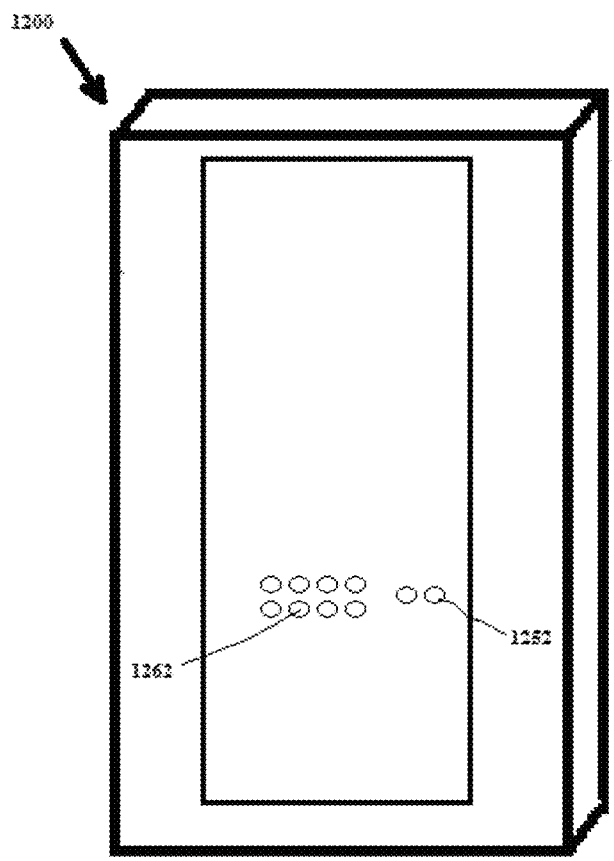
Figure 10C:
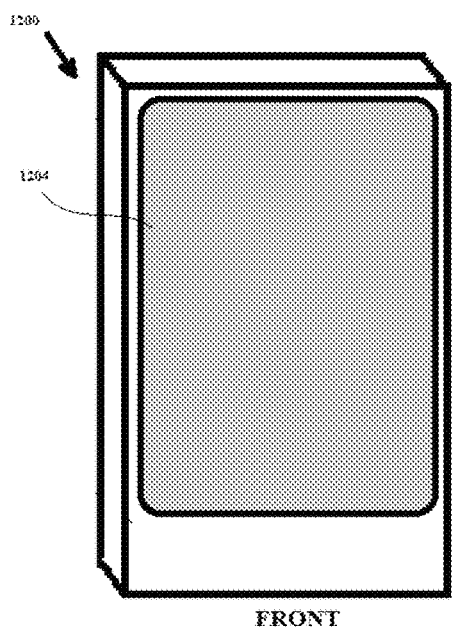

According to yet further exemplary implementations, as illustrated in FIGS. 10A-10B a smart phone or a personal communication device 1000 with a relatively small screen 1004 is provided with a detachable connector 1100. In an exemplary implementation, connector 1100 can be connected at one or more, or all, of smart phone interfaces such as audio interface 1050 and/or an 8-pin interface 1060, or the like, by matching inputs 1150 and/or 1160 to provide an alternative communication connection, for example, to another device 1200 (with a relatively large screen 1204) via, for example, matching magnetic/metallic interphases 1152 and/or 1162 in communication with respective inputs 1150 and/or 1160.

In yet further implementation of such exemplary embodiment, a host device, or display 1200, includes complimentary metallic/magnetic connection point 1252 and 1262, such that upon attachment of device 1000 by means of connector 1100 to display 1200, a passive or interactive screen 1204, can be selectively or automatically configured to mimic the functionality of passive or interactive screen 1004 of portable device 1000, or provide additional functionality, when establishing communication between display 1200 and device 1000 via magnetic contacts 1152 and 1252, and/or 1162 and 1262.

In an exemplary implementation, detachable connection between device 1000 and connector 1100 can be achieved by male-to-female connection between audio interface 1050 and input 1150, and/or male-to-female connection between 8-pin interface 1060 and input 1160.

Figure 11A:
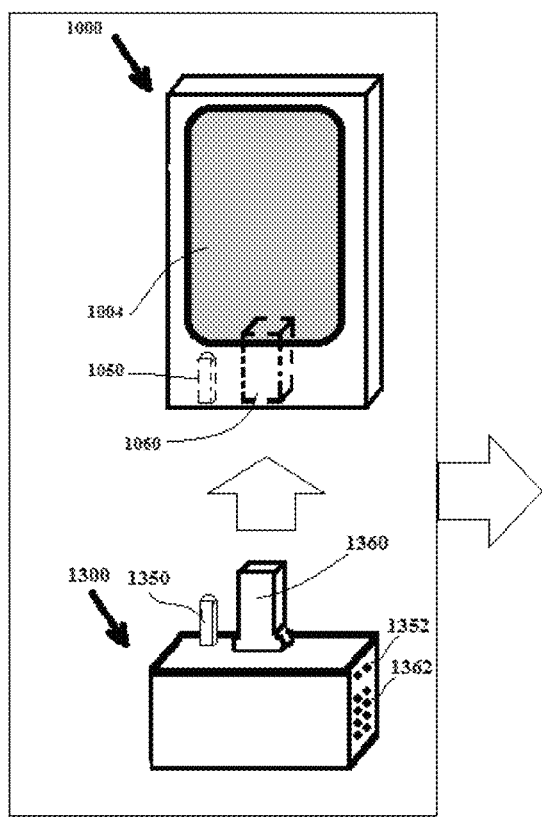
FIGS. 11A and 11B provide illustrative example of still further exemplary configurations of display systems, devices, and various components thereof, according to exemplary embodiments of the present invention.
Figure 11B:
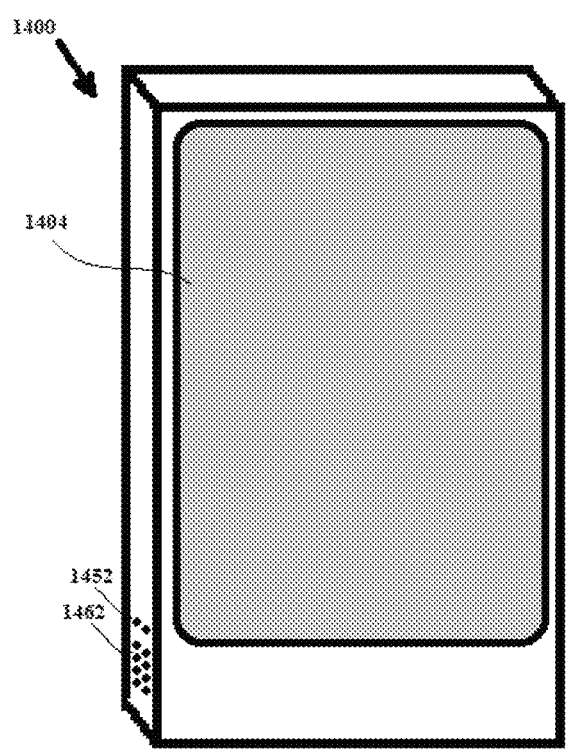

According to yet further exemplary implementations, as illustrated in FIGS. 11A-11B a smart phone or a personal communication device 1000 with a relatively small screen 1004 is provided with a detachable connector 1300. In an exemplary implementation, connector 1300 can be connected at one or more, or all, of smart phone interfaces such as audio interface 1050 and/or an 8-pin interface 1060, or the like, by matching inputs 1350 and/or 1360 to provide an alternative communication connection, for example, to another device 1400 (with a relatively large screen 1204) via, for example, matching magnetic/metallic side interphases 1352 and/or 1362 in communication with respective inputs 1350 and/or 1360.

In still further implementation of such exemplary embodiment, a host device, or display, 1400 includes complimentary metal/magnetic side connection point 1452 and 1462, such that upon attachment of device 1000 by means of connector 1300 to display 1400, a passive or interactive screen 1404, can be selectively or automatically configured to mimic the functionality of passive or interactive screen 1004 of portable device 1000, or provide additional functionality, when establishing communication between display 1400 and device 1000 via complimentary metal/magnetic side contacts 1352 and 1452, and/or 1362 and 1462. In an exemplary implementation, software contained in a storage medium of device 1000 and/or display 1400 and executable by a microprocessor of device 1000 and/or display 1400 recognizes side screen attachment (FIGS. 11A and 11B) and automatically shares content between two screens 1004 and 1404.

In an exemplary implementation, detachable connection between device 1000 and connector 1300 can be achieved by male-to-female connection between audio interface 1050 and input 1350, and/or male-to-female connection between 8-pin interface 1060 and input 1360.

Figure 12A:
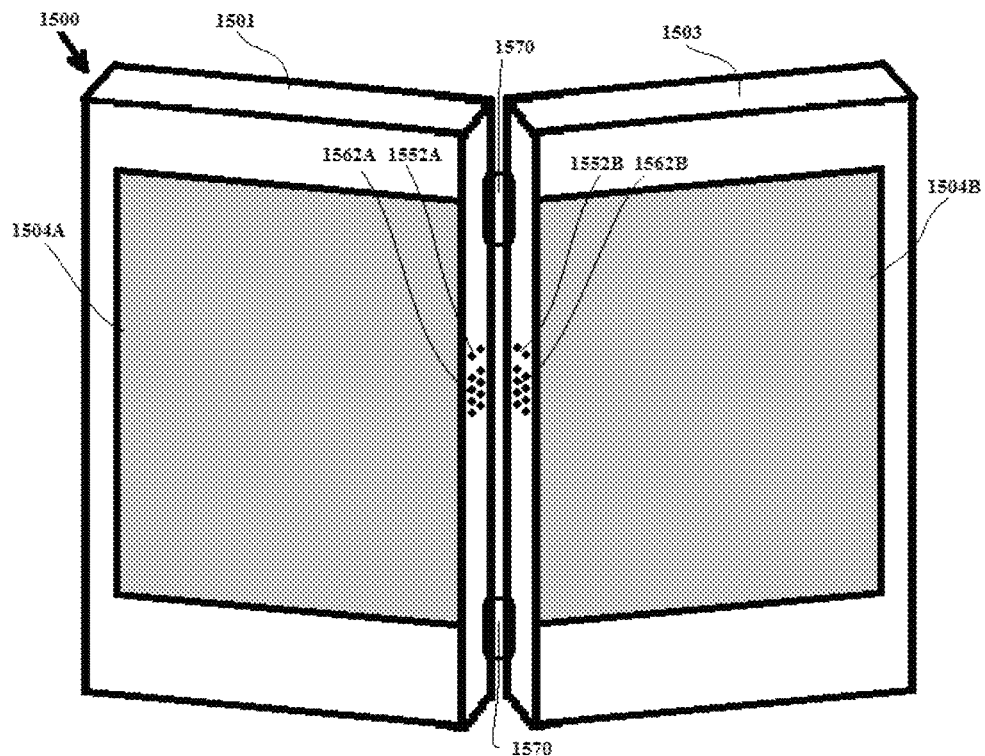
FIGS. 12A, 12B and 12C provide illustrative example of yet further exemplary configuration of display systems, devices, and various components thereof, according to exemplary embodiments of the present invention.
Figure 12B:
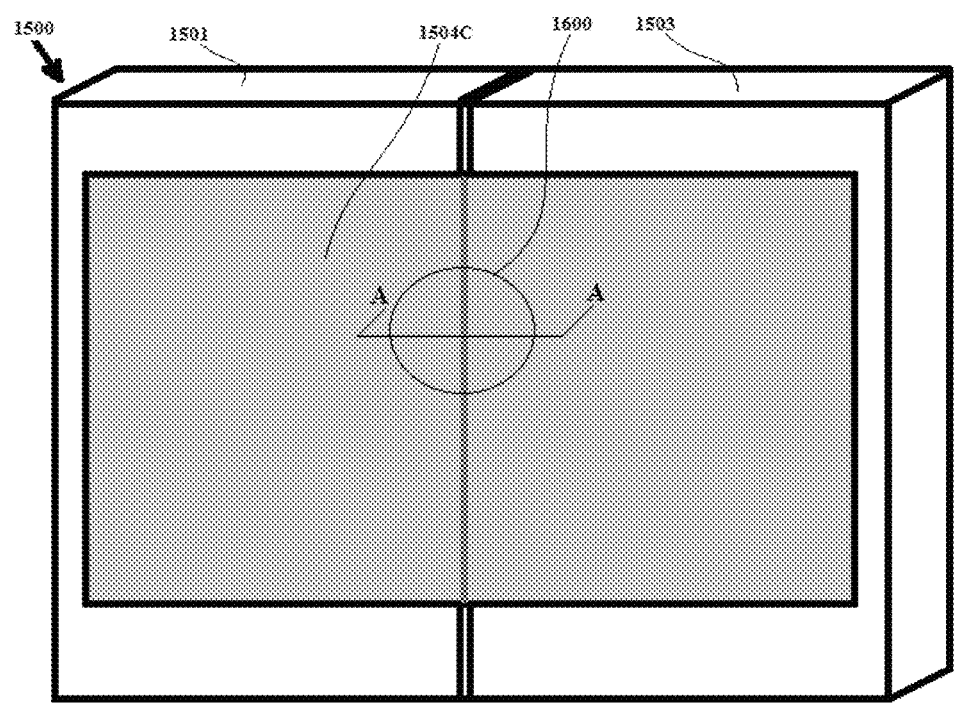

According to another exemplary embodiment of the present invention, as illustrated in FIGS. 12A-12B a smart phone or a personal communication device 1500 is a dual screen display device including first screen 1504A, which can be a primary screen of first body portion 1501, and second screen 1504 of second body portion 1503. Body portions 1501 and 1503 can be separate or stand-alone portions, or can be attached, for example pivotally, by means 1570 (which can be any conventional attachment means). First body portion 1501 included magnetic/metallic side interphases 1552A and/or 1562A, and second body portion 1503 included complimentary magnetic/metallic side interphases 1552B and/or 1562B. As illustrated in FIG. 12B, upon connection of complimentary interphases 1552A to 1552B and/or 1562A to 1562B, screens 1504A and 1504B form nearly seamless screen 1504C which, for example can provide an expanded view of screen 1504C and/or all or some of the, for example touch, functionality of screen 1504A.

In an exemplary implementation, software contained in one or more storage mediums of disposed in first body 1501 and/or second body 1503 and executable by one or more microprocessors disposed in first body 1501 and/or second body 1503 of device 1500 recognizes attachment of first body 1501 to second body 1503 and automatically expand the view and/or functionality of screen 1504A onto dual screen 1504C.

In an exemplary implementation, in a dual screen phone 1500, second body 1503 can be flipped form back to side of first body 1501 for expanded view 1504C. Such a dual screen phone 1500 with a second body 1503 including a back screen 1504B can be used in a two-sided back-to-back configuration with a wired (for example via means 1507) or wireless (for example Bluetooth) communication between first body 1501 and second body 1503, for example for a two-person game play. Second body 1503 can also be removed for greater portability of phone 1500 where first body 1501 would retain all of the functionality.

Figure 12C:
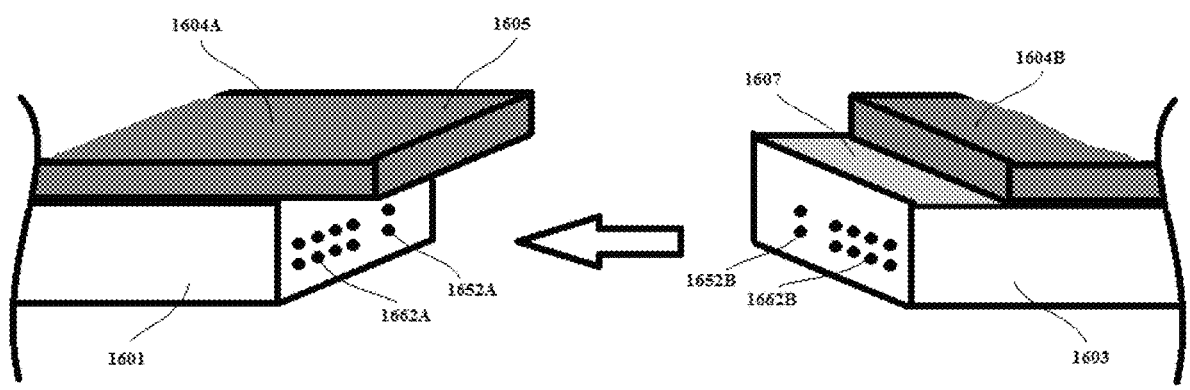

Referring to FIG. 12C, yet further exemplary implementation of embodiments of the present invention is illustrated in an enlarged three-dimensional cross-sectional view along A-A of portion 1600 of FIG. 12B. According to such an exemplary implementation, glass or other transparent cover, 1604A of front active display 1504A of first body 1601 has a protrusion 1605. On the other hand, glass or other transparent cover, 1604B of back active display 1504B of second body 1603 has a recess which leaves uncovered a portion 1607 of back active display 1504B. Portion 1607 corresponds to protrusion 1605, while covers 1604A and 1604B have an essentially identical thickness and composition, such that upon engagement of first body 1601 and second body 1603 as shown by the arrow in FIG. 12C, displays 1504A and 1504B form an essentially seamless single display, such as 1504C illustrated in the example of FIG. 12B. As describe above with respect to other exemplary implementations of present invention, the engagement of first body 1601 with second body 1603 can be by means of hinges or interlocking members, or by magnetic connection between contact 1652A to 1652B and/or 1662A to 1662B, such that the engagement facilitates connection of complimentary interphases 1652A to 1652B and/or 1662A to 1662B.

While the present invention has been shown and described with reference to certain exemplary embodiments thereof, it will be understood by those skilled in the art that various changes in form and details may be made therein without departing from the spirit and scope of the present invention.

In addition, the drawing figures that follow further describe non-limiting examples of implementations of certain exemplary embodiments of the present invention and aid in the description of technology associated therewith.

Other objects, advantages and salient features of the invention will become apparent to those skilled in the art from the details provided, which, taken in conjunction with the annexed drawing figures, disclose exemplary embodiments of the invention.

I claim:
1. A system comprising:
   a mobile communication device including a first body and a first display screen providing a visual output of said mobile communication device; and
   a host device including a second body and a second display screen and a compartment within said second body for removably accommodating said mobile communication device, said compartment accommodating therein said mobile communication device including said first body and said first display screen, wherein, when said first body and said first display screen of said mobile communication device are placed within said compartment of said second body, said second display screen interfaces with said portable device via at least one of a wired and a wireless communication such that said second display screen mimics at least one functional feature of said first display screen.

2. The system as claimed in claim 1, wherein said at least on functional features of said first display screen comprises an interactive input of said mobile communication device.

3. The system as claimed in claim 1, wherein said host device further comprises at least one of an input and an output port providing at least one of an external power and an external communication to at least one of said host device and said mobile communication device.

4. The system of claim 1, further comprising a cover to facilitate retention of said mobile communication device in said compartment of said host device.

5. The system of claim 4, wherein said second body and said cover form a weatherproof seal for said mobile communication device in said compartment of said host device.

6. The system of claim 1, wherein said second display screen has a larger surface display area than said first display screen.

7. The system as claimed in claim 1, wherein said at least on functional features of said first display screen comprises a visual output of said mobile communication device.

8. A display comprising:
a first body;
a microprocessor;
a communication interface configured for at least one of wired and wireless communication;
a first display screen; and
a compartment within said first body for removably accommodating a mobile communication device having a second body and a second display screen, said compartment accommodating therein said mobile communication device including said second body and said second display screen, wherein, when said second body and said second display screen of said mobile communication device are placed within said compartment of said first body, said microprocessor interfaces with said portable device via said communication interface such that said first display screen mimics at least one functional feature of said second display screen.

9. The display as claimed in claim 8, wherein said at least on functional features of said second display screen comprises an interactive input of said mobile communication device.

10. The display as claimed in claim 8, further comprising at least one of an input and an output port providing at least one of an external power and an external communication to at least one of said microprocessor, said communication interface, said first display screen, and said mobile communication device.

11. The display as claimed in claim 8, further comprising a cove to facilitate retention of said mobile communication device in said compartment.

12. The display as claimed in claim 8, wherein said body and said cover form a weatherproof seal for said mobile communication device in said compartment.

13. The display as claimed in claim 8, wherein said first display screen has a larger surface display area than said second display screen.

14. The device as claimed in claim 8, wherein said at least on functional features of said second display screen comprises a visual output of said mobile communication device.

* * * * *